United States Patent [19]

Yamazaki

[11] Patent Number: 4,516,171
[45] Date of Patent: May 7, 1985

[54] VIDEO TRANSFER DEVICE

[75] Inventor: Shogo Yamazaki, Tokyo, Japan

[73] Assignee: Yoshida Industry Co., Ltd., Tokyo, Japan

[21] Appl. No.: 419,900

[22] Filed: Sep. 20, 1982

[51] Int. Cl.³ ............................................. H04N 3/02
[52] U.S. Cl. ..................................... 358/214; 358/54; 358/225
[58] Field of Search ............... 358/226, 227, 214, 205, 358/209, 212, 113, 89, 213, 215, 216, 54, 225, 55

[56] References Cited

U.S. PATENT DOCUMENTS

| | | | |
|---|---|---|---|
| 4,011,403 | 3/1977 | Epstein et al. | 358/209 |
| 4,093,976 | 6/1978 | Das | 358/53 |
| 4,095,257 | 6/1978 | Back | 358/113 |
| 4,161,756 | 7/1979 | Thomas | 358/225 |
| 4,331,979 | 5/1982 | Bendell | 358/209 |

Primary Examiner—Gene Z. Rubinson
Assistant Examiner—Robert G. Lev
Attorney, Agent, or Firm—Sughrue, Mion, Zinn, Macpeak and Seas

[57] ABSTRACT

A thin film screen of disc form which is semi-transparent is rotated at high speed about its axis at right angles to the projection path of a projected movie or slide picture through an aperture within a main housing for 90° projection through a side aperture by way of an inclined mirror and a close up lens directly into a video camera through its lens system. A second close-up lens is located in front of the transparent screen for focussing the projected picture onto the screen at the focal plane of the close-up lens. A micromotor which is battery operated drives the mylar screen disc at a comparatively higher speed than that of the projected movie picture.

5 Claims, 3 Drawing Figures

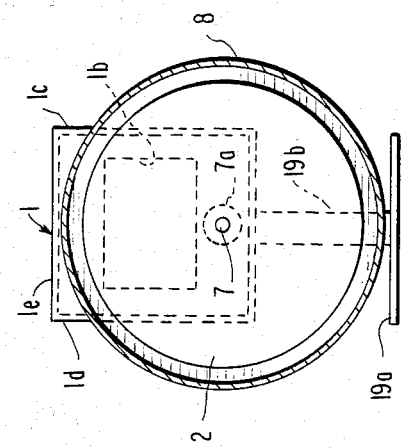
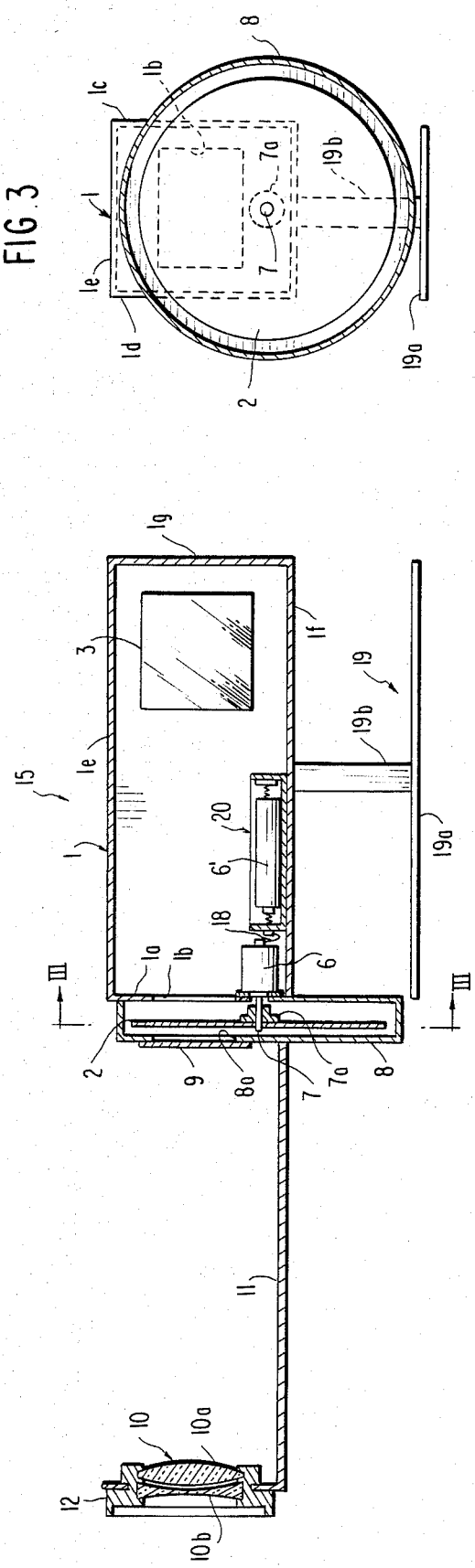
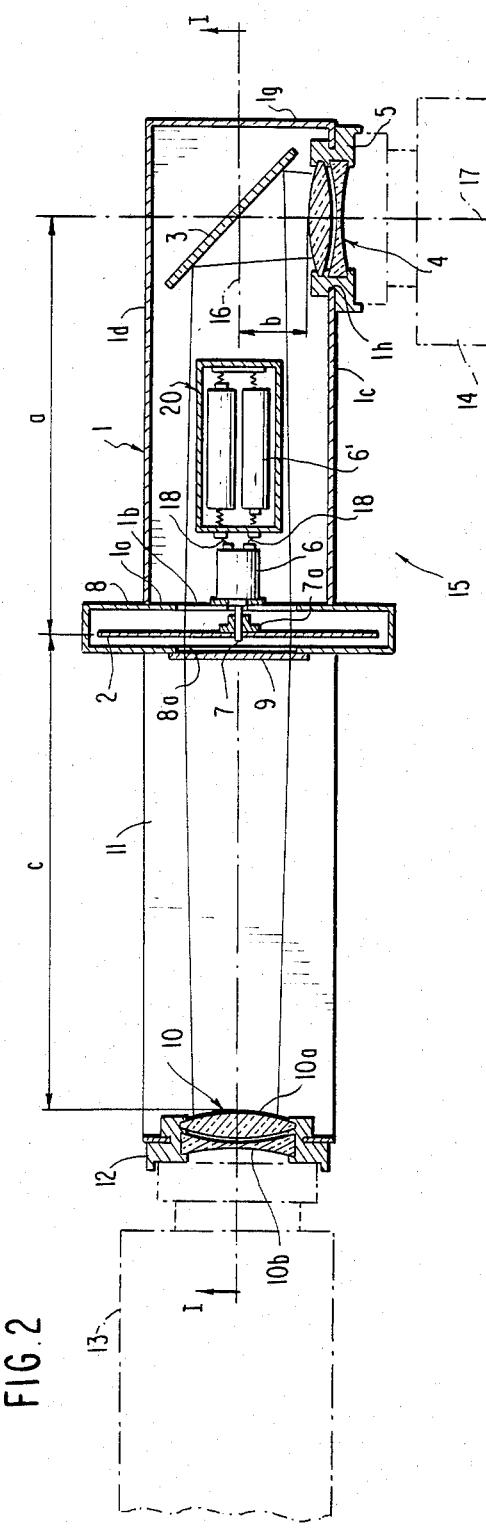

VIDEO TRANSFER DEVICE

FIELD OF THE INVENTION

This invention relates to video transfer or tele-cine devices and more particularly to a device of this type which is compact and in which an image of higher resolution may be simply and cheaply transferred from the projector to the video camera employed in making the transfer.

BACKGROUND OF THE INVENTION

Conventionally, tele-cine or video transfer devices have a screen on which the movie picture or slide picture is projected by either a movie projector or still projector. Behind the screen there is normally provided a mirror at an angle of 45 degrees which causes the image to be reflected ninety degrees and through an aperture or opening within the device housing directly into the lens system of a video camera for taking the picture from the screen or by a still camera for still picture taking, if that is desired. Conventionally, the grain of the fixed screen shows on the transferred image and thus the image is not clear and has poor resolution.

While it is known that the grain of a screen may disappear if the screen is moved at high speed, in considering conventional tele-cine or video transfer devices, the average screen size is approximately ninety mm. by seventy mm., such screens are usually formed of thick glass or plastic sheet material, making it impossible to move the screen at high speed unless the device is fairly large in size, and such improvements in tele-cine devices cannot be made at reasonable cost and may be unreasonably complicated.

It is, therefore, an object of the invention to provide an improved tele-cine device or video transfer device which transfers movie or slide pictures projected by fixed or movie projectors onto video cassette film via a video camera and particularly a device in which a very clear picture is transferred and wherein the device is of small size, low cost, and reliable in operation.

SUMMARY OF THE INVENTION

The present invention is directed to a video transfer device of compact size provided with a lightproof elongated housing including laterally opposed sidewalls, and longitudinally opposed front and rear walls. An aperture is provided within the front wall through which is projected movie or slide pictures. An aperture is provided within the sidewall near the rear wall of the housing and a mirrow is fixedly mounted within the housing adjacent the rear wall and inclined at 45° for projecting reflected light passing through the front aperture, through the side aperture, and directly onto a video camera or the like whose optical system is aligned with the sidewall aperture. A screen cover incorporated with the housing is provided with an aperture aligned with the front wall aperture. A thin flexible film semi-transparent screen disc is mounted for rotation about its axis within the screen cover, with the disc intersecting the projected image passing through the aligned apertures of the screen cover and main housing. Micromotor means are provided for driving the disc at a higher speed than the movement of the movie picture projected onto the screen and for maintaining the thin film screen disc relatively rigid during device operation. A close-up lens is preferably mounted at the front of the transparent screen at a distance such that the focal plane of the close-up lens coincides with the plane occupied by the mylar disc. A second close-up lens is positioned within the sidewall aperture of the housing to facilitate image transfer to the video camera cassette film. By utilization of the close-up lens located in front of the screen, the projected picture image on the screen is relatively small in size, permitting the screen to be driven at comparatively high speed.

BRIEF DESCRIPTION OF THE DRAWINGS

FIG. 1 is a vertical sectional view of a video transfer device forming a preferred embodiment of the invention taken about line I—I of FIG. 2.

FIG. 2 is a top view of the video transfer device shown in FIG. 1.

FIG. 3 is a vertical sectional view of the device of FIG. 1 taken about line III—III.

DESCRIPTION OF THE PREFERRED EMBODIMENT

Referring to the drawings, the video transfer device or tele-cine device indicated generally at 15 comprises a rectangular box form housing indicated generally at 1, comprised of laterally opposed sidewalls 1c, 1d,; top and bottom walls 1e and 1f; and front wall 1a and rear wall 1g. The front wall 1a is provided with a rectangular aperture or opening 1b. Fixedly mounted within housing 1 is a vertically oriented mirror 3 inclined to 45° relative to optical axis 16 of the device and functioning to project the optical image being transferred, 90° to optical axis 16 for exit along optical axis 17 through a sidewall aperture 1h within sidewall 1c. The aperture 1b is sized for the effective picture size at front wall 1a of the housing 1, using the optical system employed with the device.

Screen 2 forms an important aspect of the invention and is housed within an annular, increased diameter screen cover 8. Housing 1 carriers a reflecting mirror 3 fixedly mounted adjacent rear wall 1g of housing 1 by means (not shown). The mirror 3 is at an angle of 45° with the longitudinal axis of housing 1 and optical axis 16. It is also positioned such that it reflects the projected image passing through aperture 1b through aperture 1h within sidewall 1c of the housing 1. Mounted to aperture 1h at the sidewall 1c of the housing 1, is close-up lens 4 for focusing the transferred image on the video camera indicated generally in dotted line at 14.

The close-up lens 4 is mounted by a camera setting ring 5 to the aperture 1h and functions to transfer the image onto the taking camera, whether it be a still camera or a video camera. Alternatively a cine camera may be employed for taking pictures, for instance, from slide film projector 13, FIG. 2, which functions to provide the image for the taking camera.

In that respect, a principal characteristic feature of the present invention is the nature and make-up of semi-transparent screen 2 which is preferably located in the focal plane which the projected picture is focussed and is set to move, either by rotation or by reciprocation, at a higher speed than the speed of the film of projector 13 or of its movement in projecting the image from projector 13 to the taking camera such as the video camera 14.

A further principal element of the invention, and in particular with respect to the illustrated embodiment, is the utilization of a micromotor 6. In this case it drives the screen 2, which takes the form of a thin film disc, at a very high speed by means of shaft 7, which projects axially parallel to the optical axis 16 of the optical system of the device. Disc 2 is mounted at its center to shaft 7 for rotation about its axis by means of fitting or hub 7a. Within a battery case, indicated at 20, there are mounted two batteries 6', the batteries being connected by leads 18 to the micromotor 6 for driving the same. Switch means (not shown) are provided for selectively energizing the micromotor through batteries 6'.

Screen 2 is, as mentioned previously, of disc form and is formed of a semi-transparent thin mylar film of 0.1 mm or 0.2 mm thickness. The thin film base screen is preferably formed with one or both sides matt finished. The diameter of the thin film disc 2 is such that the edge of the screen 2 extends above the upper edge of front wall housing aperture 1b, FIG. 3.

The screen 2 is considerably thinner than conventional screens. It has no strength to hold itself tight and is quite flexible. However, when turning at high speed, it becomes tight due to centrifugal force acting upon the disc. In the drawing, the screen cover 8 is sized to the diameter of disc 2 being slightly larger and acting as an extension of the housing 1. The screen cover 8 is provided with an aperture as at 8a aligned with aperture 1b within front wall 1a of the housing 1. A detachable (ND) neutral density filter 9 is mounted to the screen cover 8 overlying aperture 8a. The filter permits the adjusting of the brightness of the picture focussed on screen 2.

In the illustrated embodiment of the invention, the screen is moved by turning the screen about its axis. However, it is envisioned that movement of the screen can be horizontal, vertical or in various directions, and the invention covers all means capable of moving the screen itself at a higher speed than the film sending speed of projector 13. Such movement is facilitated because of the light weight nature of the screen.

As a further important aspect of the invention, close-up lens 10 is installed in front of the screen 2 and is mounted by way of extension arm 11 which projects horizontally from housing 1 beyond the screen cover 8 and away from front face 1a. A stand 19 formed of a base 19a and a pedestal 19b which is fixed at its top to the bottom wall 1f of the housing provides a suitable support for the device. The slide or movie projector is indicated at 13 in dotted lines, FIG. 2, and is mounted immediately in front of the close-up lens 10 with its projection lens system touching the setting guide 12 for the close-up lens 10. The close-up lens 10, as well as close-up lens 4, are composed of a combination of a biconvex element such as element 10a (at the back) and a biconcave element 10b (at the front), for lens 10 making a highly efficient attachment lens for the device. Similar elements are provided for close-up lens 4.

The second characteristic feature of the present invention lies in the placement of the close-up lens 10 in front of screen 2 since it becomes possible to greatly reduce the picture size on screen 2. Consequently, the screen size becomes smaller, the screen is lighter, and there is reduced torque requirements for rotating the screen or moving the screen otherwise at very high speed.

Thus, the present invention employs a micromotor 6 advantageously which, in turn, is light, requiring small batteries 6' so that the drive system as a whole is small in size and light weight. This permits an overall reduction in the size of the video transfer device.

As may be appreciated by viewing FIG. 2, the relationship between the focal distance c of attachment lens 10, distance a from screen 2 to the center of the mirror 3, and the distance b from the center of the mirror to the close-up lens 4 for the device, is specifically designed to meet the relationship $(a)+(b)=(c)$.

The image projected by a movie projector such as 13 or slide projector is focussed on screen 2 through the attachment lens 10 and then reflected by mirror 3 in the main housing 1 for passage through close-up lens 4 at sidewall 1c of the housing directly onto the lens system of the camera 14.

As may be appreciated, on the basis of the present invention, the screen 2 is moving at extremely high speed so that the grain of the screen disappears, and a very clear picture image results. This is facilitated by the utilization of close-up lens 10 for providing a reduced size image at the focal plane of that lens which coincides with the plane of the thin mylar disc screen 2. In contrast to conventional tele-cine devices, which have fixed screens, if such fixed screen is to be driven or moved, the device itself would be large in size, and the drive motor must be one having relatively high power to move the heavy and thick glass or plastic screens. Thus, the cost is very high.

By the present invention, through the utilization of close-up lens 10 in front of screen 2, the picture size focused on screen 2 is quite small, and by using a thin mylar film or chemical film disc, it becomes very light in weight. Thus, we can provide a tele-cine device which is small yet produces a clear image at a very economical price. The operation of the device is readily apparent from the above description with the components in position as shown in FIG. 2, i.e with projector 13 in contact with the close-up lens 10 projector setting ring 12, and with the camera setting ring 5 being contacted by the video camera picture taking lens.

While the invention has been particularly shown and described with reference to a preferred embodiment thereof, it will be understood by those skilled in the art that various changes in form and details may be made therein without departing from the spirit and scope of the invention.

I claim:
1. In a video transfer device comprising:
an elongated lightproof housing including opposite front and rear walls,
an aperture within said front wall,
a screen adjacent said front wall aperture,
a mirror within said housing remote from said front wall and inclined 45 degrees with respect to said front wall aperture and projecting light entering the housing through said front wall aperture towards the sidewall,
a sidewall aperture aligned with the mirror and opening to a video camera lens system for recording pictures projected on said screen from a moving film of a projector outside said housing and facing said front wall aperture and said screen adjacent thereto for projecting a transfer image onto said screen,
the improvement wherein said screen comprises a semi-transparent, thin, flexible film member, said device further includes means for moving said screen at a considerably faster speed than the moving film of the projector,
and a close-up lens molunted in front of the screen at a position such that the focal plane of said close-up lens is at the plane of the semi-transparent thin flexible film member and is of substantially reduced size to maintain the device small in size, relatively inexpensive and which considerably reduces the power necessary to move said screen.

2. The device as claimed in claim 1, wherein said thin semi-transparent screen comprises a flexible film disc, said disc is mounted for rotation about its axis overlying said front wall aperture and rotatable in a plane parallel to said aperture, and wherein said means for moving said screen comprises a micromotor having a shaft coupled to said disc for rotating said disc about the disc axis.

3. The device as claimed in claim 2, wherein said housing is of elongated boxlike form, a screen cover of circular form having a diameter in excess of the width and height of said boxlike housing is mounted to the front of said housing, is of a diameter slightly larger than the diameter of said disc and includes a front wall parallel to the front wall of said housing said screen cover includes an aperture sized to and aligned with the aperture within the front wall of said housing and facing said close up lens, and wherein an extension arm extends from said screen cover away from said housing front wall, and wherein said close-up lens is fixedly mounted to said extension arm at a position such that the focal plane of the close-up lens coincides with the plane of rotation of said thin flexible disc film.

4. The device as claimed in claim 3, wherein said screen comprises a thin mylar base or chemical film base disc having at least one side matt finished and being of 0.1 mm to 0.2 mm in thickness.

5. The device as claimed in claim 1, further comprising a record close-up lens mounted to the aperture within the sidewall of the housing for contact with the optical lens of the video camera, and wherein both of said close-up lenses comprise back-to-back mounted, biconvex and biconcave elements.

* * * * *